United States Patent
Park et al.

(10) Patent No.: US 8,330,648 B2
(45) Date of Patent: Dec. 11, 2012

(54) METHOD AND APPARATUS FOR MEASURING DISTANCE IN A WIRELESS ENVIRONMENT

(75) Inventors: Jeong-Rok Park, Hwaseong-si (KR);
Jin-Serk Baik, Ansan-si (KR);
Sung-Kweon Park, Suwon-si (KR);
Do-Young Ha, Seongnam-si (KR);
Byung-Jik Kim, Seongnam-si (KR);
Joon-Oo Kim, Suwon-si (KR)

(73) Assignee: Samsung Electronics Co., Ltd, Republic of Korea (KR)

( * ) Notice: Subject to any disclaimer, the term of this patent is extended or adjusted under 35 U.S.C. 154(b) by 169 days.

(21) Appl. No.: 12/389,848

(22) Filed: Feb. 20, 2009

(65) Prior Publication Data

US 2009/0207070 A1 Aug. 20, 2009

(30) Foreign Application Priority Data

Feb. 20, 2008 (KR) .................. 10-2008-0015565

(51) Int. Cl.
*G01S 13/58* (2006.01)
(52) U.S. Cl. .................. 342/107; 342/108; 342/118
(58) Field of Classification Search ........ 356/5.01–5.15; 342/107–109, 118–146
See application file for complete search history.

(56) References Cited

U.S. PATENT DOCUMENTS

| | | | | |
|---|---|---|---|---|
| 5,532,697 A * | 7/1996 | Hidaka et al. | | 342/104 |
| 5,986,602 A * | 11/1999 | Frink | | 342/126 |
| 6,064,237 A * | 5/2000 | Lee | | 327/34 |
| 6,812,824 B1 * | 11/2004 | Goldinger et al. | | 340/10.1 |
| 7,439,904 B2 | 10/2008 | Kim et al. | | |
| 7,667,649 B2 | 2/2010 | LeFever et al. | | |
| 2007/0285306 A1 * | 12/2007 | Julian et al. | | 342/118 |
| 2009/0119044 A1 * | 5/2009 | Levesque et al. | | 702/69 |

FOREIGN PATENT DOCUMENTS

| | | |
|---|---|---|
| JP | 2000-284040 | 10/2000 |
| JP | 2001-281330 | 10/2001 |
| KR | 1020060117166 | 11/2006 |
| WO | WO 99/27738 | 6/1999 |

* cited by examiner

*Primary Examiner* — Timothy A Brainard
(74) *Attorney, Agent, or Firm* — The Farrell Law Firm, P.C.

(57) ABSTRACT

A method and apparatus for measuring a distance in a wireless environment are provided, in which a first device transmits a distance measurement signal to a second device and receives at least one response signal for the distance measurement signal from the second device, matches the received response signal with a reference signal to detect an earliest response signal, and calculates a time taken from the transmission of the distance measurement signal to the second device and the reception of the response signal from the second device using a peak value of the matched reference signal.

7 Claims, 5 Drawing Sheets

METHOD AND APPARATUS FOR MEASURING DISTANCE IN A WIRELESS ENVIRONMENT

PRIORITY

This application claims priority under 35 U.S.C. §119(a) to a Korean Patent Application filed in the Korean Intellectual Property Office on Feb. 20, 2008 and assigned Serial No. 10-2008-15565, the contents of which are incorporated herein by reference.

BACKGROUND OF THE INVENTION

1. Field of the Invention

The present invention relates generally to an apparatus and method for measuring a distance, and more particularly, to an apparatus and method for measuring a distance by measuring the Time of Arrival (ToA) of a signal.

2. Description of the Related Art

Ubiquitous computing is a concept of building a space in which all entities and objects are intellectualized and connected to an electronic space, and information is exchanged between them by adding a computing function to every physical space and object such as roads, bridges, tunnels, buildings and building walls.

The ubiquitous computing is founded on the basic premise that all computers are connected to one another, are always available to users though invisible to the users, and are integrated into their daily lives. A core infrastructure for realizing this ubiquitous environment, the ubiquitous network is an information communication network that is accessible to anyone irrespective of time and place without any constraints such as communication speed, and can distribute any type of information and content.

Owing to the realization of the ubiquitous network, users can expect to enjoy information communication services freely without many limitations encountered with legacy information communication networks and services. Particularly, a community that goes beyond time and space can be formed by use of the ubiquitous network, and various sensors and the contexts and locations of people and objects can be known through the community.

Ubiquitous computing and the ubiquitous network will create new, diverse services and a ubiquitous location-based application service for locating persons and objects at any time and place. Providing a useful service based on the locations is an important aspect of the ubiquitous environment.

Location awareness technology for acquiring information about the current location of a user is supported with priority in order to realize the ubiquitous computing that autonomously recognizes the situation of a user at any time and place, and provides a service suitable for the situation to the user. Active research is underway on location awareness technology.

Typically, wireless location awareness technologies measure the current location of a wireless device through wireless communications with another wireless device using a wireless signal. Location information permits the efficient use of information acquired through wireless communications over an efficiently configured network.

To improve the accuracy of location awareness in wireless location awareness technologies, accurate detection of the distance between two devices is important. The distance is generally calculated by the ToA of a wireless signal between the two devices.

The ToA of a signal transmitted by the other party is calculated by counting clock pulses.

FIG. 1 is a block diagram of a conventional ToA-based distance measuring apparatus. Referring to FIG. 1, the apparatus includes a first device 13 for transmitting a distance measurement signal and a second device 11 for receiving the distance measurement signal and transmitting a response signal for the distance measurement signal to the first device 13. The first device 13 has a transceiver 101 for transmitting and receiving signals to and from the second device 11, a signal detector 103 for detecting characteristics of a received signal, and a distance calculator 105 for calculating the distance to the second device 11 according to the detected signal characteristics. The signal detector 103 is provided with an original signal detector 107 and a peak detector 109.

In operation, the first device 13 transmits a distance measurement signal to the second device 11. The second device 11 transmits a response signal for the distance measurement signal to the first device 13. The transceiver 101 of the first device 13 is responsible for signal transmission and reception of the first device 13.

The original signal detector 107 of the signal detector 103 determines whether the received response signal is for the transmitted distance measurement signal. If the response signal is for the distance measurement signal, the peak detector 109 detects the peak value of the response signal and the distance calculator 105 calculates the ToA of the response signal based on the peak value.

While the ToA of the response signal is easily calculated in a single-path environment, a plurality of faded response signals can be received from a plurality of paths in a multi-path environment. The multi-path faded signals are received as one overall signal and the earliest of the response signals cannot be found. As a consequence, the second device 13 cannot be accurately located, which will be described in detail with reference to FIGS. 2A and 2B.

FIGS. 2A and 2B illustrate the waveforms of response signals that are detected using a conventional ToA scheme.

Referring to FIG. 2A, in the single-path environment, the ToA of a response signal can be calculated in the distance measuring apparatus illustrated in FIG. 1. However, in the multi-path environment, two or more response signals are generated and are overlapped in time, and thus a single response signal with a wide waveform covering all the multi-path faded response signals is received as illustrated in FIG. 2B. In this case, the earliest response signal cannot be found. If the ToA of the overall response signal is calculated based on its peak value, the difference between the intended earliest response signal and the overall response signal results in a large measurement error.

Although the earliest response signal can be extracted by a Super Resolution (SR) algorithm, a large computation complexity of the SR algorithm makes it difficult to apply to a mobile device.

SUMMARY OF THE INVENTION

An aspect of preferred embodiments of the present invention is to address at least the problems and/or disadvantages and to provide at least the advantages described below. Accordingly, an aspect of preferred embodiments of the present invention is to provide an apparatus and method for increasing the accuracy of distance measurement by approximately detecting the earliest of multi-path faded response signals overlapped in time in a multi-path environment.

In accordance with an aspect of the present invention, there is provided a method for measuring a distance in a wireless environment, in which a first device transmits a distance measurement signal to a second device and receives at least one response signal for the distance measurement signal from the second device, matches the received response signal with a reference signal to detect an earliest response signal, and calculates a time taken from the transmission of the distance measurement signal to the second device and the reception of the response signal from the second device using a peak value of the matched reference signal.

In accordance with another aspect of the present invention, there is provided an apparatus for measuring a distance in a wireless environment, in which a transceiver transmits a distance measurement signal to a device to which a distance is to be measured and receives a response signal for the distance measurement signal from the device, a signal detector detects a peak value of an earliest response signal from the received response signal, and a distance calculator measures the distance using the peak value of the earliest response signal.

BRIEF DESCRIPTION OF THE DRAWINGS

The above and other objects, features and advantages of preferred embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the present invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

In a multi-path environment, response signals are overlapped in time and thus a single response signal with a wide waveform covering all the response signals is received. In this case, the earliest response signal cannot be found, making accurate distance measuring difficult. In this context, the present invention provides a novel method for detecting the peak value of an earliest response signal by matching the waveform of response signals received in the multi-path environment with that of a reference signal set based on a response signal received without multi-path fading.

Figure 3:
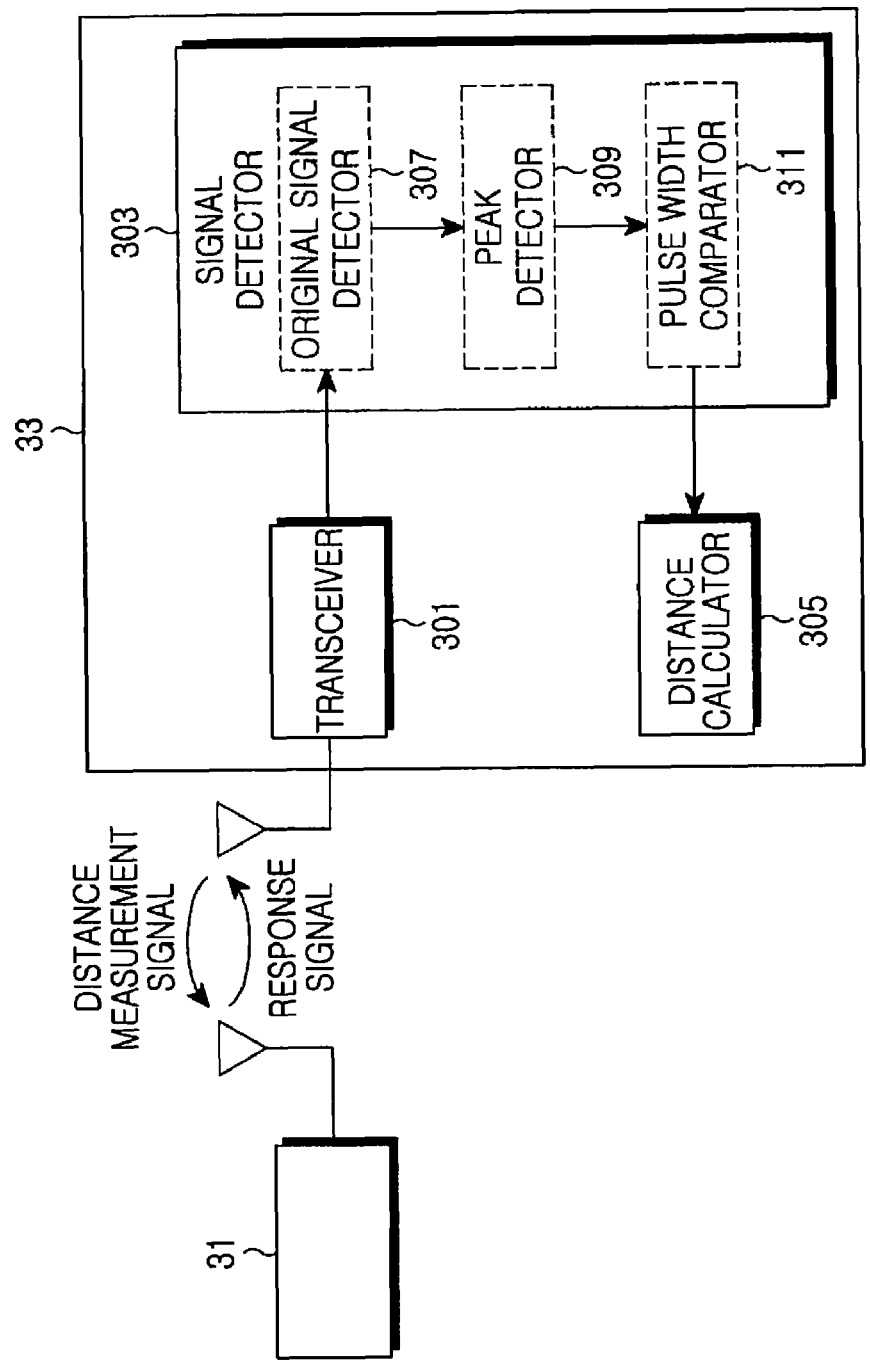
FIG. 3 is a block diagram of a ToA-based distance measuring apparatus according to the present invention.

FIG. 3 is a block diagram of a ToA-based distance measuring apparatus according to the present invention.

Figure 1:
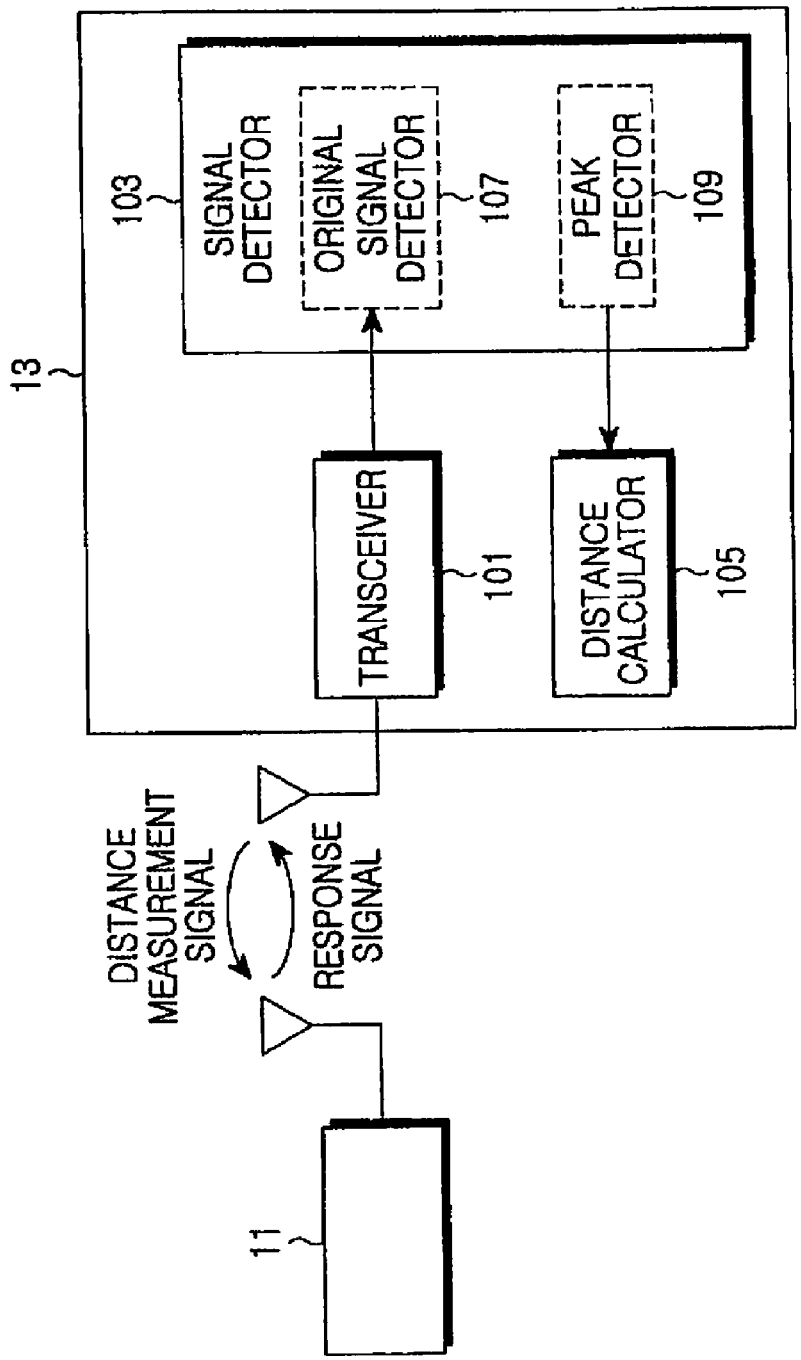
FIG. 1 is a block diagram of a conventional ToA-based distance measuring apparatus.
Figure 2A:
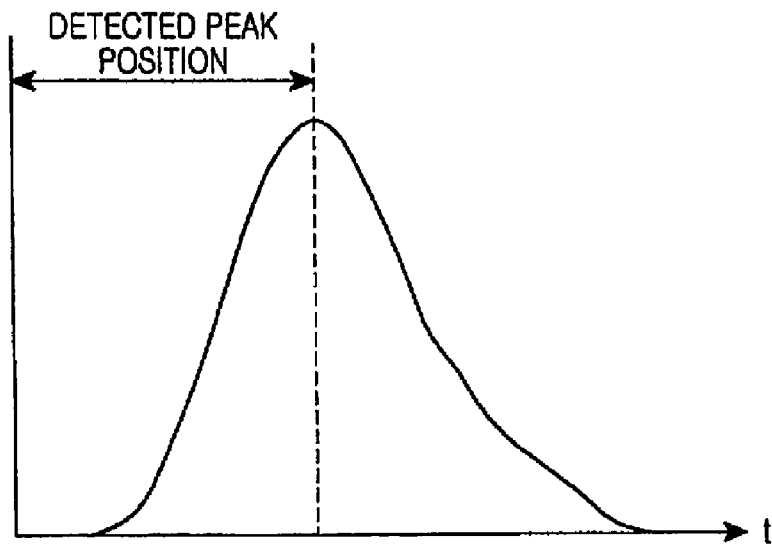
FIGS. 2A and 2B illustrate the waveforms of response signals that are detected using a conventional ToA scheme.
Figure 2B:
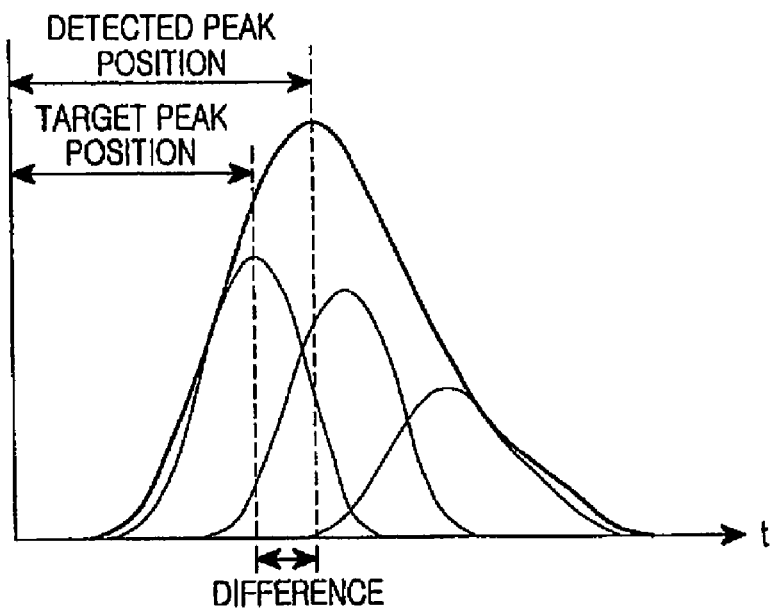

Referring to FIG. 3, the ToA-based distance measuring apparatus includes a first device 33 for transmitting a distance measurement signal and a second device 31 for receiving the distance measurement signal and transmitting a response signal for the distance measurement signal to the first device 33. The first device 33 has a transceiver 301 for transmitting and receiving signals to and from the second device 31, a signal detector 303 for detecting characteristics of a received signal, and a distance calculator 305 for calculating the distance to the second device 31 according to the detected signal characteristics. The signal detector 303 is provided with an original signal detector 307, a peak detector 309, and a pulse width comparator 311. Compared to the conventional configuration illustrated in FIG. 1, the ToA-based distance measuring apparatus of the present invention further includes the pulse width comparator 311 for comparing the pulse width of a response signal with that of a reference signal.

In operation, the first device 33 transmits a distance measurement signal to the second device 31. The second device 31 transmits a response signal for the distance measurement signal to the first device 33. The transceiver 301 of the first device 33 is responsible for signal transmission and reception of the first device 33.

The original signal detector 307 of the signal detector 303 determines whether the received response signal is for the transmitted distance measurement signal. If the response signal is for the distance measurement signal, the peak detector 309 detects the peak value of the response signal and the pulse width comparator 311 detects the peak value of an earliest response signal by comparing the pulse width of the response signal received from the peak detector 309 with the reference signal created based on a response signal received without multi-path fading. The distance calculator 305 calculates the ToA of the received response signal based on the peak value of the earliest response signal.

Figure 4:
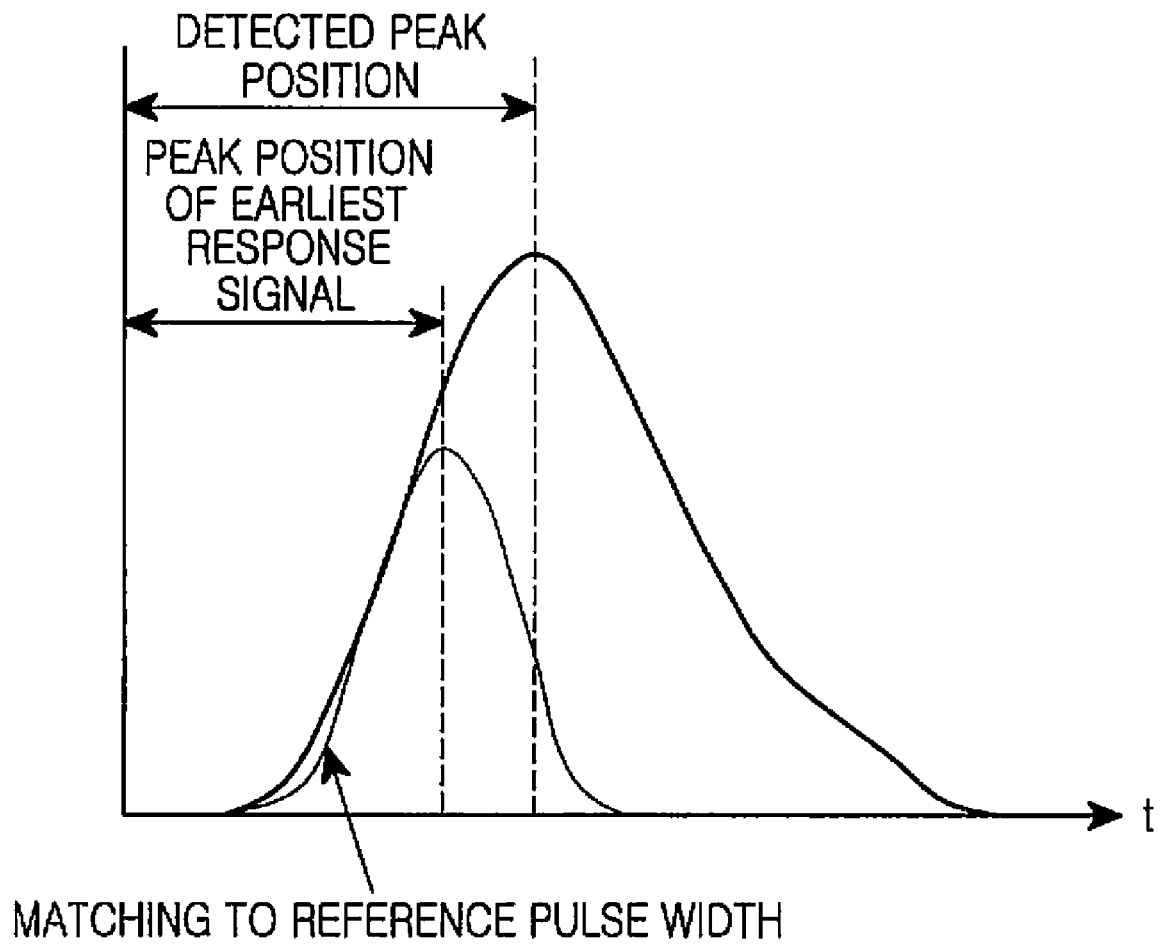
FIG. 4 illustrate matching between the waveform of an overall multi-path faded response signal and that of a reference signal set for detecting an earliest response signal according to the present invention.

FIG. 4 illustrates matching between the waveform of an overall multi-path faded response signal and that of a reference signal set for detecting an earliest response signal according to the present invention.

Referring to FIG. 4, the earliest response signal is approximately detected by matching the overall multi-path faded response signal with the reference signal. The position of the earliest response signal can be approximated using the peak value of the reference signal, with the start of the waveform of the overall multi-path faded signal aligned with that of the waveform of the reference signal. A method for determining the reference signal will be described below in detail.

Figure 5:
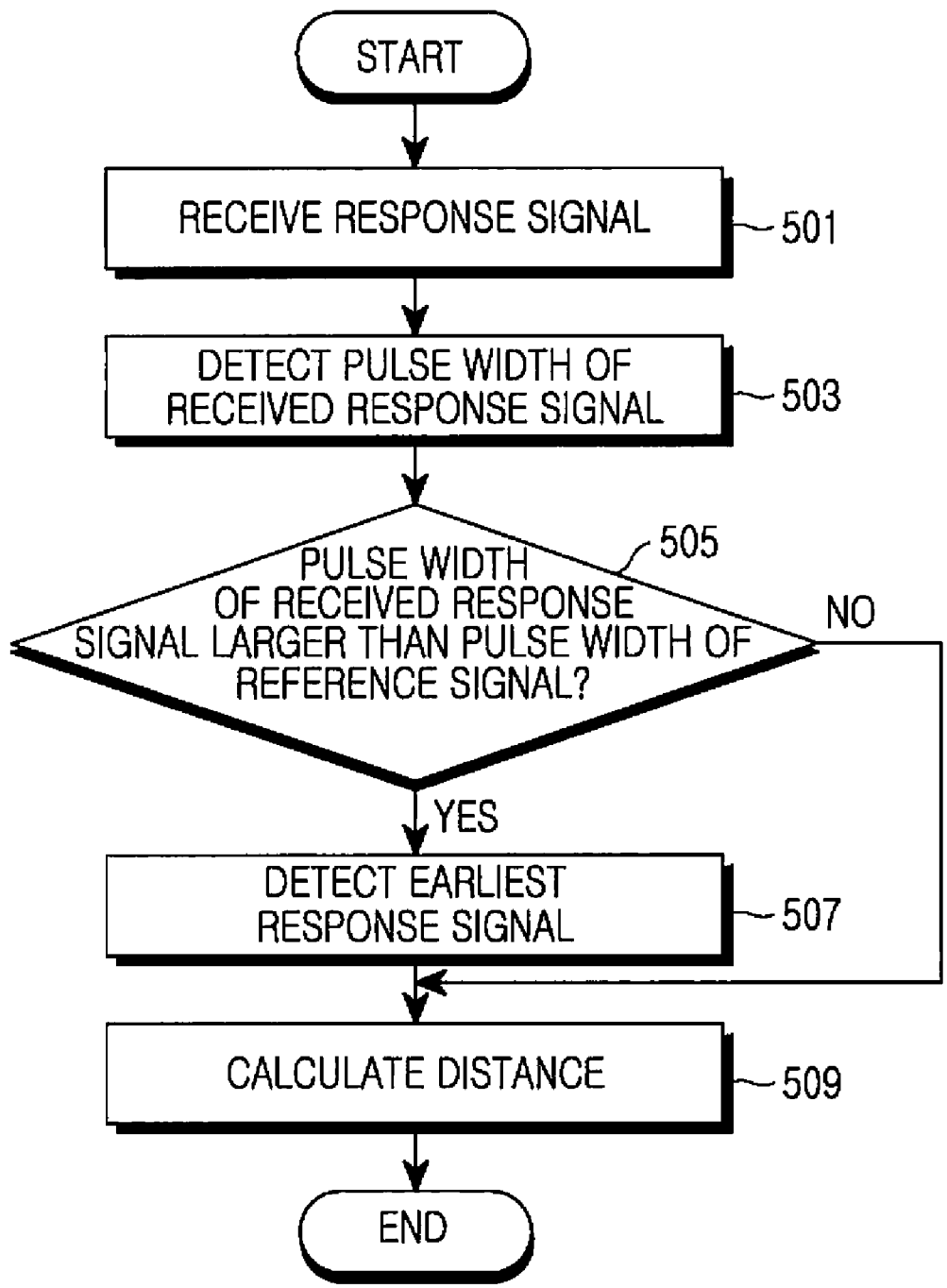
FIG. 5 illustrates a ToA-based distance measuring operation according to the present invention.

FIG. 5 illustrates a ToA-based distance measuring operation according to the present invention. In FIG. 5, it is assumed that a distance measurement signal has been transmitted. With reference to FIGS. 3 and 5, an operation for detecting an earliest response signal will be described.

Referring to FIG. 5, the transceiver of a response signal-receiving device receives a response signal and determines whether the response signal is a response for the transmitted distance measurement signal in step 501. Two or more response signals are be received and overlapped in time, and take the form of one overall response signal in a multi-path environment. In step 503, the pulse width of the response signal is compared with a threshold. A signal with a pulse width less than the threshold is classified as noise and eliminated from the response signal. Then the pulse width of the response signal is detected by finding the peak value of the noise-free response signal. In general, the overall multi-path faded signal covers a plurality of response signal and thus has a larger pulse width than a single response signal.

In step 505, the overall multi-path faded response signal is compared with the reference signal in pulse width. If the pulse width of the reference signal is larger than that of the overall multi-path faded signal, which indicates that the overall multi-path faded signal is actually a single response signal, an actual distance is measured based on the peak value of the response signal acquired in step 503.

If the pulse width of the reference signal is less than that of the overall multi-path faded signal, the peak value of an earliest response signal is detected by matching the pulse width of the reference signal with that of the overall multi-path faded signal. The pulse width of the reference signal can be determined using Received Signal Strength Indication (RSSI).

The RSSI represents the value of a received signal, and is in inverse proportion to the square of distance. According to the present invention, the RSSI is the power value of a received signal, with no regard to antenna gain or loss within circuits. The RSSI may vary each time a signal is received at one position, depending on the reception distance and environment of the signal. The pulse width of the reference signal is computed in Equation (1) based on an RSSI by $$\text{reference pulse width} = \alpha \times \text{single pulse width} \quad (1)$$

where $\alpha$ denotes a value proportional to RSSI that is inversely proportional to the square of distance, ranging from 0 to 1, and single pulse width is defined as a pulse width measured at a reference RSSI. The single pulse width can be measured experimentally or simulated.

The peak value of the earliest signal can be calculated by approximately matching the start of a pulse of the overall multi-path faded signal with that of a pulse of the reference signal. In step 509, the position of the earliest response signal can be computed based on the peak value of the earliest response signal.

As is apparent from the above description, the present invention can increase the accuracy of distance measurement by approximately detecting the earliest of multi-path faded response signals with a simple structure, without using an SR algorithm which is difficult to apply to a mobile device due to a large volume of computation in a wireless environment.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for measuring a distance in a wireless environment, comprising:
   transmitting a distance measurement signal to a second device and receiving at least one response signal for the transmitted distance measurement signal from the second device by a first device;
   matching a received response signal waveform with a reference signal waveform to detect a peak value of an earliest response signal waveform by the first device;
   detecting the peak value of the earliest response signal waveform using a result of the matching by the first device; and
   calculating a time taken from the transmission of the distance measurement signal to the second device and the reception of the response signal from the second device using a peak value of the earliest response signal by the first device,
   wherein a pulse width of the reference signal is computed by:

$$\text{reference pulse width} = \alpha \times \text{single pulse width}$$

where $\alpha$ denotes a value proportional to Received Signal Strength Indication (RSSI), and single pulse width is defined as a pulse width measured at a reference RSSI, and
   wherein the peak value of the reference signal is detected according to the pulse width of the reference signal.

2. The method of claim 1, wherein the response signal reception comprises:
   determining whether the received response signal is a response for the distance measurement signal; and
   eliminating noise from the received response signal by comparing the received response signal with a threshold.

3. The method of claim 2, wherein the comparison between the received response signal with the threshold comprises comparing the threshold with a width of a waveform of the response signal, classifying a signal with a waveform width less than the threshold as noise, eliminating the noise from the response signal, and detecting a signal with a waveform width larger than the threshold as an original signal.

4. The method of claim 1, wherein the matching of the received response signal is a pulse width matching that comprises detecting the earliest response signal by aligning the start of a pulse of the received response signal with the start of a pulse of the reference signal.

5. An apparatus for measuring a distance in a wireless environment, comprising:
   a transceiver for transmitting a distance measurement signal to a device to which a distance is to be measured and receiving a response signal for the transmitted distance measurement signal from the device;
   a signal detector for matching a received response signal waveform with a reference signal waveform to detect a peak value of an earliest response signal waveform by the first device, and detecting the peak value of the earliest response signal waveform from the received response signal using a result of the matching; and
   a distance calculator for measuring the distance using the peak value of the earliest response signal,
   wherein a pulse width of the reference signal is computed by:

$$\text{reference pulse width} = \alpha \times \text{single pulse width}$$

where $\alpha$ denotes a value proportional to Received Signal Strength Indication (RSSI), and single pulse width is defined as a pulse width measured at a reference RSSI, and
   wherein the peak value of the reference signal is detected according to the pulse width of the reference signal.

6. The apparatus of claim 5, wherein the signal detector comprises:
   an original signal detector for determining whether the received response signal was transmitted by the device;
   a peak detector for detecting a peak value of the response signal determined as an original signal; and
   a pulse width comparator for matching a pulse width of the received response signal with a pulse width of a reference signal.

7. The apparatus of claim 6, wherein the pulse width comparator compares the pulse width of the received response signal with the pulse width of the reference signal, if the pulse width of the received response signal is larger than a pulse width of a single response signal, and transmits the received response signal as the earliest response signal to the distance calculator.

* * * * *